Patented Apr. 20, 1954

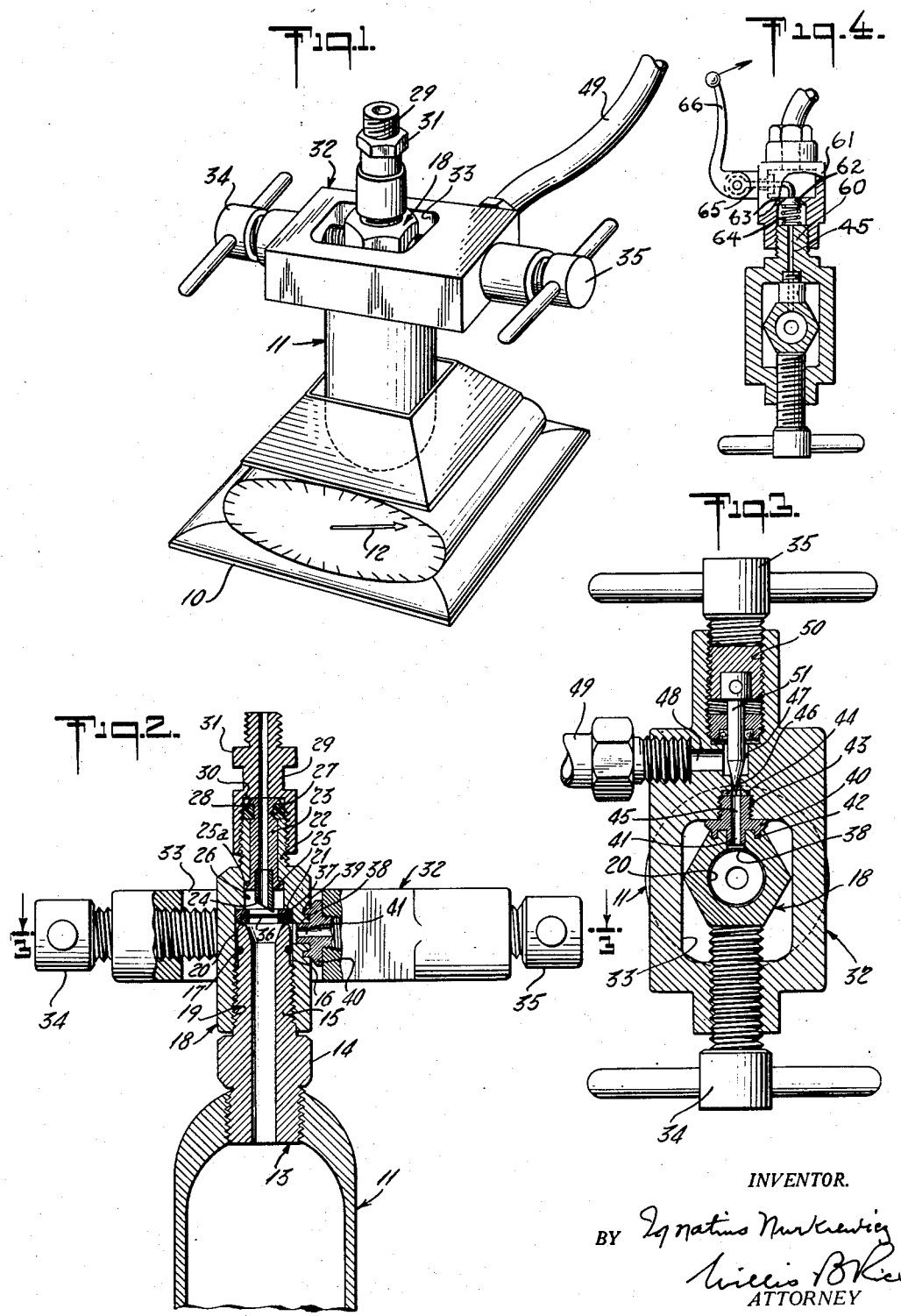

2,675,941

UNITED STATES PATENT OFFICE 2,675,941

APPARATUS FOR FILLING GAS CYLINDERS UNDER HEAVY PRESSURE

Ignatius Nurkiewicz, Brooklyn, N. Y., assignor to Stop-Fire, Inc., Brooklyn, N. Y., a corporation of New York Application December 24, 1949, Serial No. 134,975

4 Claims. (Cl. 222—5)

This invention relates to an apparatus for filling a gas cylinder under heavy pressure from a source of supply and for insuring at all times a leakproof joint.

For many purposes relatively small cylinders of gas under heavy pressure are used commercially, either as a propellant in fire extinguishers or for soda water fountains or for such uses as cutting and welding. Because of the heavy gas pressures required to secure a sufficient volume of gas in the cylinder, such cylinders are customarily closed by a metallic sealing disc, which retains the gas in place, but which can be punctured when the gas is to be used.

It is an object of this invention to provide a device in which a container of the character described may be filled from a source of gas supply, such as a large receptacle, and thereafter may be closed by a sealing disc without leakage during the filling operation.

It is a further object to provide a connector for closing such a container, which will permit the introduction of the gas and the sealing of it with a closing disc after it is filled and which at the same time will provide a mechanism for puncturing the sealing disc when it is desired to use the gas.

The invention accordingly comprises an apparatus possessing the features, properties and the relation of elements which will be exemplified in the apparatus hereinafter described and the scope of the application of which will be indicated in the claims.

For a fuller understanding of the nature and objects of the invention, reference should be had to the following detailed description taken in connection with the accompanying drawings, in which:

Fig. 1 is a perspective view of the mechanism embodying this invention;

Fig. 2 is a side elevation with the central parts of the device in section; and

Fig. 3 is a horizontal section through the center of the mechanism. Fig. 4 is a modification.

In the drawings, the numeral 10 indicates a stand on which the container 11 which is to be filled rests in an upright position. This stand may take the form of a spring balance, having an indicating hand 12 to weigh the quantity of gas which is inserted in the cylinder.

The container 11 is impervious except at its upper end, which is closed by a hollow stud 13 tightly screwed into it. This stud may have a hexagon body 14, above which the stud 13 is reduced in size and threaded, as shown at 15, and above the threaded portion is a cylindrical portion 16 circumferentially grooved to receive a packing ring, as shown at 17. Over the threaded end the cylindrical portion 16 of the stud 13 is fitted a head 18 having female threads 19 to engage the threaded portion 15 and having above this thread a cylindrical portion 20 parallel to and closely mating with the cylindrical portion 16 of the stud 13 in a position to be tightly engaged by the packing ring 17.

The head 18 has an interior shoulder 21 forming a recess to receive a sealing disc 36, hereafter described. This recess is in alignment with the upper end of the stud 13. The head 18 terminates at its upper end as a threaded hollow stud 22 in which there slides a nipple 23, carrying a hollow sharp piercing tool 24. This nipple 23 has a flange 25 closely fitting within a cylindrical portion 26 in the head 18. This flange is in position to engage a shoulder 25ᵃ at the upper end of the cylindrical portion 26.

The nipple 23 has a circumferential recess 27 positioned to receive a plastic washer 28 which extends out over the end of the stud 22, so that the nipple is held against upward movement by the flange 25 and against downward movement by the resilient washer 28.

A cap or hose coupling 29 has a socket at its lower end having a thread which screws on to the stud 22, and this socket terminates in a shoulder 30 in position to bear against the top of the nipple 23. The body of this cap may be hexagonal, as shown at 31, so that it may be screwed on to or off of the coupling 29. With this construction, the nipple 23 may be caused to slide in head 18 by screwing the coupling 29 downwardly to compress the washer 28.

A sealing disc 36 having the usual soft rim 37 is fitted within the cylindrical portion 20 of the head 18 tightly against the shoulder 21 in such a manner, that if the head 18 is screwed on to the stud 13 tightly, the rim 37 will be tightly clamped between the shoulder 21 and the top of the stud 13, whereas if the head 18 is turned off of the stud, space will be left between the rim 37 and the top of the stud 13 to give access into the interior of the container under the disc.

The head 18 is provided with a port on one side, as shown at 38, at a point substantially opposite the top of the stud 13 and surrounding the opening 38 upon the exterior face of the head within the cylindrical groove 39.

Surrounding the head 18 and detachably connected to it is a connector frame 32, having an opening 33 to fit over the head 18 and provided with screws 34 and 35 screwed into it on the opposite sides. One of these screws 34 holds the frame in place upon the head, as will be described, and the other screw 35 controls the influx of gas.

The frame 32 has an inwardly extending stud 40 in alignment with the screw 35 having a teat projecting outwardly, as shown at 41, adapted to enter the port 38 previously described. This teat is surrounded by a circular rim 42 adapted to enter the groove 39. When the frame is in place upon the head, the screw 34 is used to force the stud 40 into tight gas-pressed engagement with the side of the head 18.

The head 18 is provided with a lateral port 38, at a point substantially opposite the top of the stud. This port leads through the cylinder surface 20, and is adapted to be connected with a port 45 in a connector frame hereafter to be described and through this port gas may be charged into the cylinder 11.

The screw 35 is screwed into a threaded cylindrical opening 50 in alignment with the opening 45 and carries a tapered pin 51, adapted to cooperate with the edge of the opening 46 to serve as a valve to cut off communication between the cavity 47 and the opening 45. Suitable washers and packing will be applied to the screw 35 and the pin 51 to prevent leakage to the outside when under pressure.

The operation of the device is as follows:

When it is desired to fill the cylinder 11 from the gas supply, the cylinder is held in an upright position on the stand 10. The head 18 with the sealing disc 36 within it is screwed slightly off of the nipple 13 to afford communication between the chamber defined between the nipple 13 and the cylindrical chamber 20, this chamber being already in communication with the port 38. During this time leakage is prevented by the washer 17.

The frame 32 is now clamped in place with the gas hose screwed into the opening 48 and with the screw 35 turned inwardly to close off communication between the cavity 47 and the opening 45. Gas is now admitted to the hose 49 and the valve 35 is screwed outwardly, whereupon the gas passes inwardly into the cavity 47, out through the opening 45, upwardly within the cylindrical chamber 20, past the end of the stud 13 into the interior of the stud and downwardly into the cylinder.

The amount of gas will be registered upon the indicator 12 and when the desired quantity of gas is admitted, the valve 35 is closed and the cylinder 11 is rotated to screw the stud 13 into the threaded portion 19 of the head, until the upper end of the stud 13 engages the soft rim 37 and completely shuts off the cylinder with a hermetic seal. When this is done, the gas from the supply is completely sealed at the opening 46 and the gas within the cylinder is completely sealed by the sealing disc 36. The frame, therefore, may be taken off and the cylinder removed and replaced by another cylinder to be filled. The full cylinder will remain fully charged until the disc 36 is punctured.

In operation, when it is desired to use the gas within the container, the coupling 29 is screwed into the device to which the gas is to be fed thereafter. A slight turning of the container 11 while the coupling 29 is held by its thread will cause the coupling to press upon the upper end of the nipple 23, thereby forcing the piercing tool 24 into the closing disc 36, permitting the gas from the container to pass upwardly through the central bore in the coupling.

Fig. 4 shows an alternative construction in which a conventional form of valve may be used to admit the fluid in substitution for the valve previously described. In this case the stud 60 is pivoted upon the frame 32 to which a valve casing 61 is screwed. This valve casing contains a valve 62 spring pressed against a valve seat 63 by a spring 64 which is here shown as released by a lever 65 operated by a handle 66. It will be understood that this is a conventionalized showing only and within the broad aspects of the invention any conventional form of valve may be employed at this point if desired.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

What is claimed is:

1. A device for filling and emptying gas containers of the portable type comprising a stud attachable to the container, having a threaded portion and terminating in an upper end, a head screwed on to said threaded portion, having a recess containing a tightly fitting sealing disc, said disc being positioned to be clamped against said upper end to seal the container, said head and said stud having coaxial openings therethrough separated by said disc, a port within said head at the upper end of said stud below said disc, connectors affording connection between a source of gas supply and said port, a gas valve within said connectors, a hollow piercing tool slidable within said coaxial opening in said head, a member movable with regard to said head for forcing said piercing tool through said disc and a connector communicating with the interior of said hollow piercing tool for connecting a gas consuming device.

2. A device according to claim 1, in which said piercing tool moving mechanism comprises a cap screw threaded on to the top of said head, said cap having an annular shoulder, said piercing tool having a recess, an annular resilient washer mounted in said piercing tool recess and seated on the top end of said head, said cap shoulder engaging said piercing tool whereby on screwing said cap tightly upon said head, the resilient washer will be compressed and said piercing tool will pierce the sealing disc.

3. A device for filling and emptying gas containers of the portable type comprising a stud attachable to the container having a threaded portion and terminating in an upper end, a head screwed on to said threaded portion having a recess containing a tightly fitting sealing disc, said disc being positioned to be clamped against said upper end to seal the container, said stud and head having coaxial openings therethrough separated by said disc, a lateral port within said head terminating at a point in communication with said upper end and below said disc and having an exterior opening, a connector carried by said head for connection between the coaxial opening in said head and a gas consuming device, a piercing tool slidable in said head and means for sliding said tool to pierce said disc, in combination with a frame having an inlet connector, a gas valve and an outlet port, said frame being shaped to be clamped about said head, with said outlet port in hermetic connection with said exterior opening, a clamping means for effecting such clamping.

4. A device according to claim 3 in which the means for operating said piercing tool comprises a cap screw connected to said head and having a shoulder engaging said piercing tool, a second shoulder upon said cap above the top edge of said head and a resilient packing between said cap and said head within a recess in said piercing tool.

References Cited in the file of this patent

UNITED STATES PATENTS

| Number | Name | Date |
|---|---|---|
| 872,812 | Giron | Dec. 3, 1907 |
| 1,832,639 | Kneeland | Nov. 17, 1931 |
| 1,927,170 | Hornor | Sept. 19, 1933 |
| 2,028,651 | Dagnall et al. | Jan. 21, 1936 |
| 2,059,189 | Allen | Nov. 3, 1936 |
| 2,120,248 | Hinchman | June 14, 1938 |
| 2,365,364 | Temple | Dec. 19, 1944 |